(12) United States Patent
Iwa

(10) Patent No.: US 7,828,264 B2
(45) Date of Patent: Nov. 9, 2010

(54) FLOW CONTROL VALVE

(75) Inventor: Toshiaki Iwa, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 408 days.

(21) Appl. No.: 11/921,462

(22) PCT Filed: Jun. 1, 2006

(86) PCT No.: PCT/JP2006/310985

§ 371 (c)(1),
(2), (4) Date: Dec. 3, 2007

(87) PCT Pub. No.: WO2006/129753

PCT Pub. Date: Dec. 7, 2006

(65) Prior Publication Data

US 2009/0114871 A1    May 7, 2009

(30) Foreign Application Priority Data

Jun. 3, 2005    (JP) .............................. 2005-164359

(51) Int. Cl.
*F16K 47/00*    (2006.01)
(52) U.S. Cl. .................... 251/122; 251/121; 251/129.15
(58) Field of Classification Search ................. 251/120, 251/121, 122, 129.15, 333
See application file for complete search history.

(56) References Cited

U.S. PATENT DOCUMENTS

| | | | |
|---|---|---|---|
| 5,878,992 A * | 3/1999 | Edwards et al. ............. | 251/122 |
| 6,349,920 B1 * | 2/2002 | Lewis et al. .................. | 251/122 |
| 6,352,416 B1 | 3/2002 | Ota et al. | |
| 6,607,007 B1 * | 8/2003 | Hull et al. .................... | 137/613 |
| 6,832,619 B1 * | 12/2004 | Walsh .......................... | 137/14 |
| 7,234,680 B2 * | 6/2007 | Hull et al. .................... | 251/121 |
| 2005/0035321 A1 | 2/2005 | Uemura et al. | |

FOREIGN PATENT DOCUMENTS

| | | |
|---|---|---|
| CN | 1266946 A | 9/2000 |
| CN | 1580561 A | 2/2004 |
| EP | 1039129 A2 | 9/2000 |
| EP | 1507109 A1 | 4/2004 |
| JP | 09-144929 | 6/1997 |
| JP | 2001-082626 | 3/2001 |
| JP | 2001-248751 | 9/2001 |
| JP | 2002-31052 | 1/2002 |
| JP | 2004-301295 | 10/2004 |
| JP | 2005-061303 | 3/2005 |
| JP | 2006-125292 | 5/2006 |
| KR | 2000-062874 A | 10/2000 |

\* cited by examiner

*Primary Examiner*—John K Fristoe, Jr.
(74) *Attorney, Agent, or Firm*—Arent Fox LLP

(57) ABSTRACT

A capacity control valve where a valve section is caused to be in contact with and separated from a valve seat by a valve rod to control the flow rate of pressurized fluid. The capacity control valve includes a first valve rod having a valve section and having a first peripheral surface formed on its outer periphery, a first valve chamber having a valve seat that comes into contact with and is separated from the valve section and having a first path into which pressurized fluid flows, and a valve housing having a through-hole that is movably fitted on the first peripheral surface of the first valve rod. The through-hole of the valve housing has a first tapered surface diverging as it goes away in the axial direction from the first valve chamber.

7 Claims, 5 Drawing Sheets

FLOW CONTROL VALVE

TECHNICAL FIELD

The present invention relates to a flow control valve with a reduced slide friction of the valve rod under its operation, and more particularly, a flow control valve for preventing a malfunction of the valve rod caused by fine particles contained in operating fluid which get caught between a through bore disposed in the valve housing and the valve rod.

BACKGROUND ART

A flow control valve, for example, effects a control of a control fluid operating inside a displacement-type compressor and a discharge fluid discharged therefrom by means of valve opening/closing actions. The discharge fluid contains ferrous particles or aluminum particles caused by abrasion during the operation within the displacement-type compressor. Silicon particles contained in liquid glass which is used for a displacement-type compressor are also mixed into the discharge fluid during the operation. Diameter of these particles is approximately 10 micrometer so that they are apt to get stuck between the slide surfaces. Since the particles stuck between the slide surfaces of the valve rod in the flow control valve are likely to cause a trouble in operation, how to solve it has been an immediate concern. There is a solution to the problem in which a filter is disposed before the fluid is introduced into the flow control valve in order to collect the particles. Disposing the filter, however, causes a rapid loading of the filter, thereby deteriorating the performance of the flow control valve. Also as the loading of the filter increases the pressure of the control fluid inside the piping, the control of the flow control valve is made difficult. At any rate, the fine particles contained in the operating fluid of the flow control valve deteriorate the operation of the valve rod. Therefore resolving this problem is of vital importance.

Further details will be described below. There is a flow control valve for a variable displacement compressor as prior art of the present invention. For example, there are a patent reference 1 and patent reference 2 given below. A valve body is disposed in the operating valve rod of the flow control valve. This valve rod executes valve opening/closing actions by means of operating with the solenoid rod of a solenoid portion which is connected with the valve rod. And the valve rod is guided under operation by a fit engagement surface which is disposed in the valve housing.

The above prior art is explained-further below. A flow control valve 100 in FIG. 5 is similar to the flow control valve disclosed in FIG. 1 of the patent reference 1 or FIG. 1 of patent reference 2 given below. This flow control valve 10 is comprised of a valve main body 110, a pressure-sensing device 120 and a solenoid portion 130. A valve housing 111 which defines the outer profile of the valve main body 110 disposes a through bore which extends therethrough in axial direction thereof. This through bore disposes a guide bore surface 111A and a valve chamber 115 therein. The valve chamber 115 receives a discharge port 103 which extends through side wall thereof. The guide bore surface 111A also receives a control port 104 for a control fluid which extends through side wall thereof. There is also disposed a pressure-sensing chamber 122 to the lower portion of the guide bore surface 111A as shown in the figure which communicates with the through bore. There is also disposed a suction port 105 in the valve housing 111 which communicates with the pressure-sensing chamber 122.

A pressure-sensing device 120 is disposed in the pressure-sensing chamber 122. This pressure-sensing device 120 contracts or stretches according to the suction pressure Ps of the fluid introduced from the suction port 105 into the pressure-sensing chamber 122. This pressure-sensing device 120 is connected with the valve rod 108.

There is disposed a solenoid portion 130 in the upper portion of the valve main body 110 in the figure. The solenoid portion 130 then disposes a fixed iron core (also referred to as fixed core) 131 and moveable iron core (also referred to as moveable core) 133 therein. There is a solenoid coil surrounding the fixed iron core 131 and the moveable iron core 133. A magnetic field generated in accordance with the current supplied to the solenoid coil creates a mutual attraction force. A solenoid rod 133A connected with the moveable iron core 133 is connected with a valve rod 108. A rod guide bore 131A which fittingly mates a first slide rod 106 of the valve rod 108 in freely moveable manner is disposed in the fixed iron core 131.

This valve rod 108 disposes a valve portion 102 to a first slide rod 106. There is also disposed a connection rod which is a lower part in the figure of the valve portion 102 of the valve rod 108 and smaller in diameter than the first slide rod 106. A passageway 116 is defined between the connection rod and the guide bore surface 111A. The discharge port 103 and the control port 104 come to a direct communication via passageway 116 when the valve portion 102 opens. The communication between the discharge port 103 and, the control port 104 is shut off when the valve portion 102 is in a closing position. A portion of the valve rod 108 further closer to the pressure-sensing device 120 forms a second slide rod 107. Outer circumferential surface 107A of the second slide rod 107 forms a freely moveable fit engagement with the guide bore surface 111A. The fit engagement of the second slide rod 107 relative to the guide bore surface 111A shuts out a communication between the suction port 105 and the control port 104. Guide provided for the first slide rod 106 and the second slide rod 107 by means of small clearance gap formed relative to the rod guiding bore 131A and the guide bore surface 111A makes it possible for the valve portion 102 to rest on a valve seat in a seal-tight manner.

In the flow control valve 100 thus configured, FIG. 4 is an enlarged view for explaining the problem encountered in FIG. 5. The discharge fluid F introduced or discharged from the discharge port 103 contains ferrous particles, aluminum particles or silicon particles. These particles are fine particles whose diameter ranges from 10 micrometers to 20 micrometers. A fine particle P, as shown in FIG. 4, gets caught between the fit engagement surface of the first slide rod 106 and rod guiding bore 131A. Then when the first slide rod 106 and the second slide rod 107 are tilted away from the axis line, a portion of the fit clearance above the fine particle P in the figure becomes narrower. This leads to that the fine particle P will be accumulated in the fit clearance gap between the first slide rod 106 and the rod guiding bore 131A even when the discharge fluid F under discharge pressure Pd forms an upstream flow. When the valve rod 108 tries to operate, the fine particle P squeezed in the fit clearance gap between the first slide rod 106 and the rod guiding bore 131A hampers the prescribed operation of the valve rod 108. Therefore it becomes difficult to control the control fluid as desired in the flow control valve 100.

Patent reference 1: Japanese Patent Laid-Open Publication No. 2001-248761 (FIG. 1)

Patent reference 2: Japanese Patent Laid-Open Publication No. 2002-31052 (FIG. 1)

DISCLOSURE OF THE INVENTION

Technical Problems to be Solved by the Invention

The present invention is proposed for alleviating the above mentioned disadvantages, and the technical problem to be solved by the invention is to prevent a delayed response of the valve rod of the flow control valve due to friction between fine particles and the valve rod. Another technical object is to improve the valve opening/closing response in the valve portion. Yet another object is to prevent wear of the sliding faces of the valve rod due to friction with the fine particles.

Means for Solving the Technical Problems

A primary object of the present invention is to solve the above mentioned technical problems, and a solution to such problems is embodied as follows.

Flow control valve of the present invention is a flow control valve for controlling a flow volume of pressure fluid by means of a valve rod making a valve portion rest on or lift from a valve seat. The flow control valve is comprised of a first valve rod and a valve housing in which the first valve rod retains the valve portion and disposes a first circumferential surface on outer circumference thereof and in which the valve housing disposes a first valve chamber and a through bore therein, in which the first valve chamber disposes a valve seat and a first passageway, in which the valve seat is defined on the perimeter of a valve hole, in which the first passageway permits pressure fluid to flow thereto, in which the valve hole opens or closes relative to the valve portion, in which the through bore communicates with the first valve chamber at the opposite side of the valve seat, in which the through bore is able to form a fit engagement in a freely moveable manner with the first circumferential surface of the first valve rod, wherein the through bore of the valve housing disposes a first tapered surface which opens in a diverging manner as moving away from the first valve chamber.

EFFECTS OF THE INVENTION

According to the flow control valve of the present invention, pressure fluid is introduced from the valve hole into the control port side when the valve body opens up the valve within the first valve chamber. As the pressure fluid contains fine particles therein under this circumstance, the fine particles get caught between the first valve rod and the first tapered surface. However, since the first tapered surface in the through bore is arranged to gradually expand as it moves away from the first valve chamber, the fine particles are swept away from the first tapered surface by the pressure fluid. Therefore as no fine particles remain between the first tapered surface and the first valve rod, a malfunction of the first valve rod caused by friction due to the fine particles stuck on the first tapered surface can be prevented. Wear of the first valve rod due to sliding relative to the fine particles can also be prevented.

Figure 1:
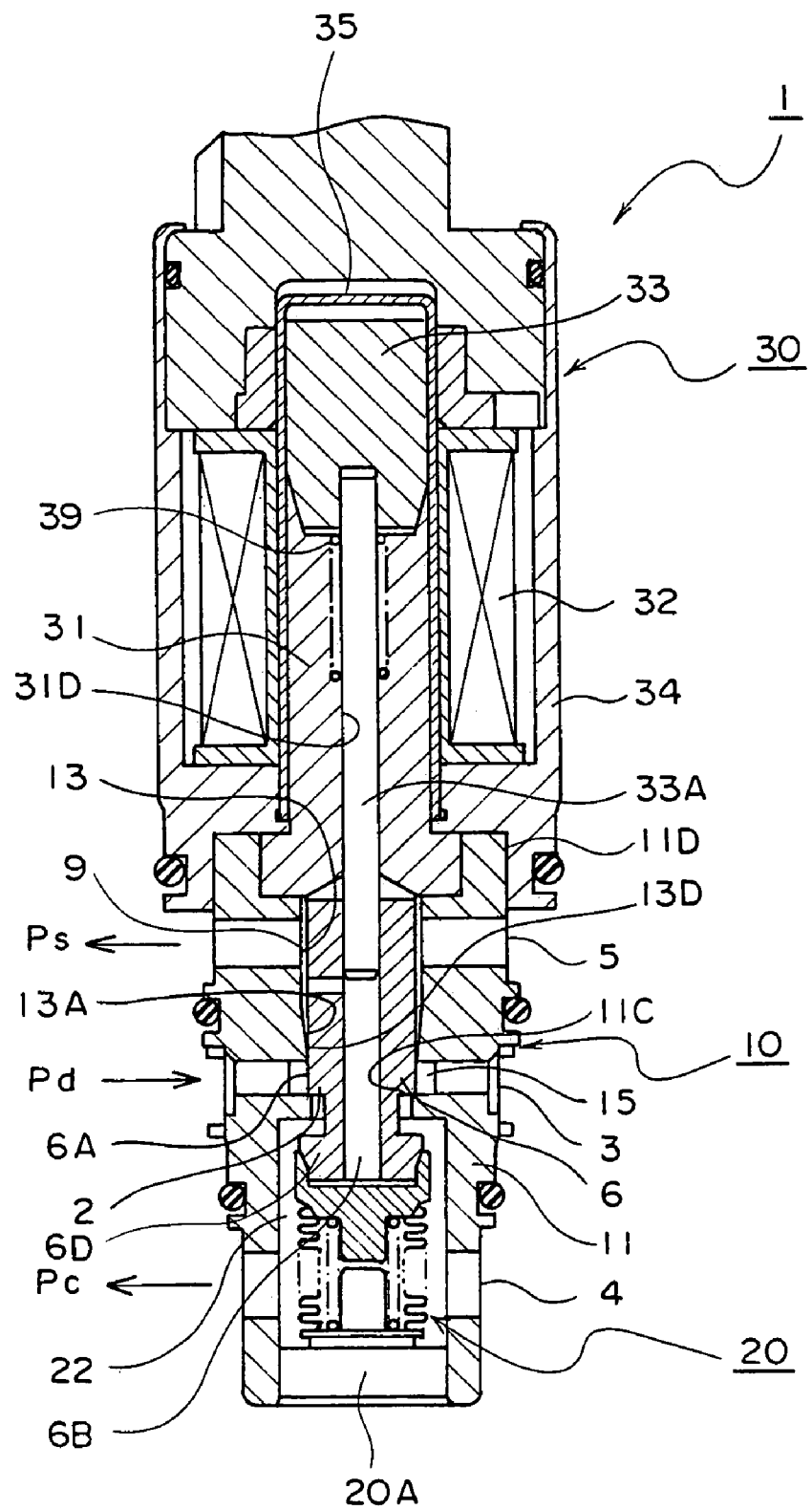
FIG. 1 is a full cross-sectional view of a flow, control valve as a first embodiment of the present invention.

DESCRIPTION OF REFERENCE NUMERALS 1 flow control valve
2 valve portion
2A valve face
3 first passageway
4 second passageway
5 third passageway
6 first valve rod
6A first circumferential surface
6B passage hole
6D joint protrusion portion
9 second valve chamber
10 valve main body
11 valve housing
11C valve seat
11D joint portion
13 through bore
13A first tapered surface
13D first fit engagement diameter surface
15 first valve chamber
20 pressure-sensing device
20A cover portion
22 pressure sensing chamber
30 solenoid portion
31 fixed iron core
31D guiding bore
32 solenoid coil
33 moveable iron core
33A solenoid rod
34 casing main body
35 tube

BEST MODE FOR CARRYING OUT THE INVENTION

Described below is the details of the figures of a preferred embodiment in accordance with the principles of the present invention. All the figures explained below are constructed according to actual design drawings with, accurate dimensional relations.

First Embodiment

Figure 2:
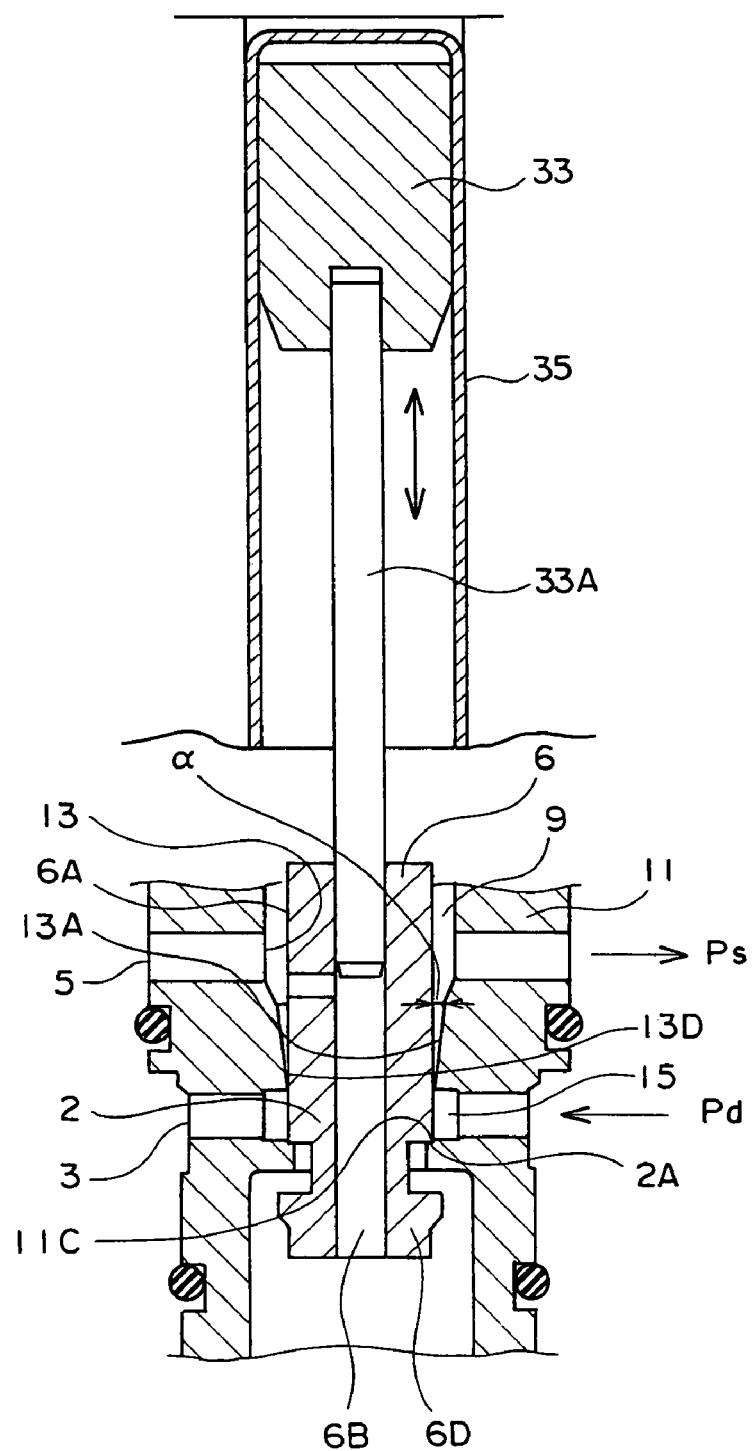
FIG. 2 is a partial cross-sectional view enlarging a portion of the flow control valve in FIG. 1.

FIG. 1 is a cross-sectional view of a flow control valve as a first embodiment related to the present invention. Also FIG. 2 is a partial cross-sectional view enlarging a portion of the flow control valve in FIG. 1. In FIG. 1 and FIG. 2, the flow control valve 1 has such a construction that a solenoid portion 30, valve main body 10 and pressure-sensing device 20 are joined together. The valve main body 10 disposes a valve housing 11 therein which defines outer profile thereof. The valve housing 11 forms a through bore 13 therewithin. The valve housing 11 is made of metal such as brass, aluminum, stainless or the like or synthetic resin and the like. This flow control valve 1 is advantageous for the use in a variable displacement compressor.

This valve housing 11 forms a first valve chamber 15 which is located on its way of the through bore 13 and whose diameter is larger than that of the through bore 13. And besides, there is a pressure-sensing chamber 22 in large diameter which is disposed further down in the figure of the first valve chamber 15 of the valve housing 11 and communicates with the first valve chamber 15 via valve orifice thereof. Perimeter of the valve orifice in the first valve chamber 15 defines a valve seat 11C. The through bore 13 located opposite the valve seat 11C in the first valve chamber 15 defines a first fit engagement circumferential surface 13D which is arranged smaller in diameter in the first valve chamber 15 side and forms a freely moveable fit engagement relative to the first valve rod 6. The axial length of the first fit engagement circumferential surface 13D is in the range of from 1 mm to 3 mm. And the first fit engagement circumferential surface 13D is arranged larger in diameter than the first valve rod 6 by 0.01 mm to 0.1 mm. Moreover; a first tapered surface 13A is defined from the first fit engagement circumferential surface 13D toward the solenoid portion 30. This first tapered surface 13A expands as it moves away from the first valve chamber 15. And besides, the inclination angle at of the first fit engagement circumferential surface 13D relative to the center axis should preferably be in the range of from 0.1 to 0.5 degrees.

Also the valve housing 11 disposes a third passageway 3 which communicatively connects the first valve chamber 15 with its external and extends sideways for introducing the fluid at discharge pressure Pd (also referred to as pressure fluid) from the piping, not shown. A plurality of the first passageways 3 are disposed on the circumferential, surface of the valve housing 11. And besides, there is disposed a second valve chamber 9 in the through bore 13 at the larger diameter side of the first tapered surface 13A in an abutting relation with the first tapered surface 13A, whose diameter is more or less the same as the maximum diameter of the first tapered surface 13A. And this second valve chamber 9 may also be arranged larger than the maximum diameter of the first tapered surface 13A in an abutting relation. The second valve chamber 9 receives a plurality of third passageways 5 which are disposed along the outer circumference and extend therefrom radially inward. These third passageways 5 permits the fluid at suction pressure Ps.

The foresaid pressure-receiving chamber 22 disposes a second passageway 4 thereto. There further is disposed a pressure-sensing device 20 within the pressure-receiving chamber 22. Mount portion disposed at one distal end of the pressure-sensing device 20 is attached to a cover portion 20A while a joint recess portion disposed at other distal end thereof forms a contact in a freely attaching/detaching manner with a joint protrusion portion 6D which is disposed at the end portion of the first valve rod 6. And a resilient urging force of the pressure-sensing device 20 urges the first valve rod 6 towards the solenoid portion 30. Action of the pressure-sensing device 20 is determined by a combination of a force received from the pressure fluid (also referred to as operating fluid) within the pressure-sensing chamber 22 and the resilient urging force given by the pressure-sensing device 20.

The first valve rod 6 is arranged in a cylindrical form. Lower end portion of the first valve rod 6 in the figure forms the joint protrusion portion 6D which is connected with the joint recess portion of the pressure-sensing device 20 as explained earlier. A portion above the first valve 6 in the figure defines a neck portion which forms a clearance fit with a valve hole in the inner circumference of the valve seat 11C. And besides, a portion above the neck portion defines a valve portion 2, and the end face of the valve portion 2 defines a valve face 2A which rests on or lifts from the valve seat 11C (refer to FIG. 2). There is also disposed a first circumferential surface 6A on the outer circumference of the first valve rod 6. The first circumferential surface 6A of the first valve rod 6 forms a fit engagement with the first fit engagement diameter surface 13D in a freely slidable manner. The first valve rod 6 forms a passage hole 6B in axial center thereof. The passage hole 6B establishes a communication between the pressure-sensing chamber 22 and the second valve chamber 9 when the joint protrusion portion 6D lifts from the joint recess portion. The other distal end portion of the solenoid rod 33A which is connected with the moveable iron core 33 is securely connected with the passage hole 6B of the first valve rod 6.

A clearance gap formed between the first circumferential surface 6A of the first valve rod 6 and the first fit engagement diameter surface 13D is in a range of from 0.01 mm to 0.08 mm so that the fine particles can pass therethrough. This clearance gap should suffice to provide a support in a suitable range so as to achieve a seal tight contact between the valve portion 2 and the valve seat 11C. This clearance gap, at the same time, should be designed to be able to effect a seal by sustaining a pressure differential between the inlet side and the outlet side (second valve chamber 9 side) of the pressure fluid (fluid at discharge pressure Pd). O-ring or the like for a sealing purpose is not used in a clearance gap formed relative to the valve rod 6 in order to keep a slide friction of the valve rod 6 small under its operation. And this clearance gap should be small enough to keep leakage of the pressure fluid (fluid at discharge pressure Pd) minimal (such a minimal leakage should not cause any problem from the flow control point of view). And besides, the clearance gap should leave some tolerance so that the valve portion 2 and the valve seat 11C are able to form a seal-tight contact with each other when the respective surfaces come to a valve closing position while yet this clearance gap should not be too large to cause too much a tilt of the axial center. The valve opening/closing actions of the valve portion 2 relative to the valve seat 11C provides a control in a crank chamber by means of sending a high-pressure fluid at discharge pressure Pd into the crank chamber (control chamber) of a compressor, not shown, as fluid at control pressure Pc. Instead of disposing the foresaid first fit engagement diameter surface 13D by leaving intact a portion of the through bore 13 starting from the first valve chamber 15, a first tapered surface 13A may directly be formed from the first valve chamber 15. The first tapered surface 13A thus directly formed from the first valve chamber 15 enjoys an easy ejection of the fine particles from the first tapered surface 13A. In the first embodiment, however, a portion of the through bore 13 defines the first fit engagement diameter surface 13D in order to align the first valve rod 6 to the axial center during the execution of specified operations of the first valve rod 6. The first tapered surface 13A or first fit engagement diameter surface 13D at first valve chamber 15 side thereof should preferably be arranged in a circular arc form. Furthermore, the first fit engagement diameter surface 13D should be made of a hard material (for example, the entire valve housing 11 can be made of a hard material, or a bushing element in a cylindrical form which defines the first fit engagement diameter surface 13D can be securely mounted to a large diameter surface which is fabricated by enlarging the diameter of a portion of the through bore 13 in the valve housing 11).

A solenoid portion 30 is mounted in a portion above the valve main body 10 in the figure. Casing main body 34 of the solenoid portion 30 is made of a conductive metal, fabricated in a cylindrical form with a bored bottom by means of forging. The fit bore formed at the bottom surface of the casing main body 34 securely fits a joint portion 11D of the valve main body 10 so as to join the solenoid portion 30 with the valve main body 10 in an integral manner. The solenoid portion 30 disposes a pair of a fixed irons core 31 and a moveable iron core 33 within the casing main body 34. The moveable iron core 33 at the fixed iron core 31 side forms an attracted portion which protrudes in a conical shape. This moveable iron, core 33 comes to a fit engagement with a cylindrical tube 35 in freely slidable manner. Also the fixed iron core 31 fixed to the tube 35 forms an attracting, portion at one end surface thereof which has a conical recess surface and mates the attracted portion of the moveable iron core 33. Furthermore, a spring 39 disposed between the fixed iron core 31 and the moveable iron core 33 always provides a resilient, urging force in a direction pushing the moveable iron core 33 away from the fixed iron core 31. The valve main body 10 side of the fixed iron core 31 is arranged to form a flange portion which is securely fitted with a mount bore of the valve main body 10. Then the moveable iron core 33 is actuated according to a magnetic field generated by the current supplied to an electromagnetic coil 32 which is disposed in the outer circumference of the fixed iron core 31. The fixed iron core 31 also disposes a solenoid rod guiding bore 31D which passes through center axis thereof. The solenoid rod 33A then is inserted into the solenoid rod guiding bore 31D and operates with the movement of the moveable iron core 33.

In the flow control valve 1 constructed as described above, when the valve portion 2 opens the valve by lifting from the valve seat 11C a fluid at discharge pressure Pd is introduced from the first passageway 3 into the first valve chamber 15. The fluid then flows from the valve hole to the second passageway 4 by way of the pressure-sensing chamber 22. A small portion of the fluid flows in the direction of the first fit engagement diameter surface 13D due to a high pressure nature of the discharge pressure Pd. However, as the length of the first fit engagement diameter surface 13D is less than a few millimeters and clearance gap thereof is very narrow, the pressures in the fluid passing through the clearance gap of the first fit engagement diameter surface 13D builds up and fine particles contained in the fluid are prevented from getting caught and biting between the sliding surfaces. Since a first tapered surface 13A is formed immediately after the first, fit engagement diameter surface 13D, the fine particles flow along the gradually expanding clearance gap which is formed between the first tapered surface 13A and the first valve rod 6, thereby quickly being discharged from the first fit engagement diameter surface 13D. This valve portion 2 opens or closes the valve hole by lifting from or resting on the valve seat 11C for controlling a fluid at control pressure Pc as control fluid. Therefore the first valve rod 6 iterates operations in an axial direction of the first tapered surface 13A whenever the valve portion 2 makes the valve opening/closing actions. The foresaid ejection effect of the first tapered surface 13A prevents an increase in slide friction of the first valve rod 6 caused by the fine particles contained in the fluid.

As described earlier, the fluid under discharge pressure Pd or control pressure Pc contains fine particles such as ferrous particles and aluminum particles derived from an compressor and the like or silicon particles contained in liquid glass or the like. Even in different kinds of apparatus using a flow control valve 1, a variety of fine particles may be contained in the fluid. The flow control valve 1 installed in such an apparatus can prevent an increase in slide resistance which is induced by the friction between the fine particles and the first valve rod 6 under operation.

Second Embodiment

Figure 3:
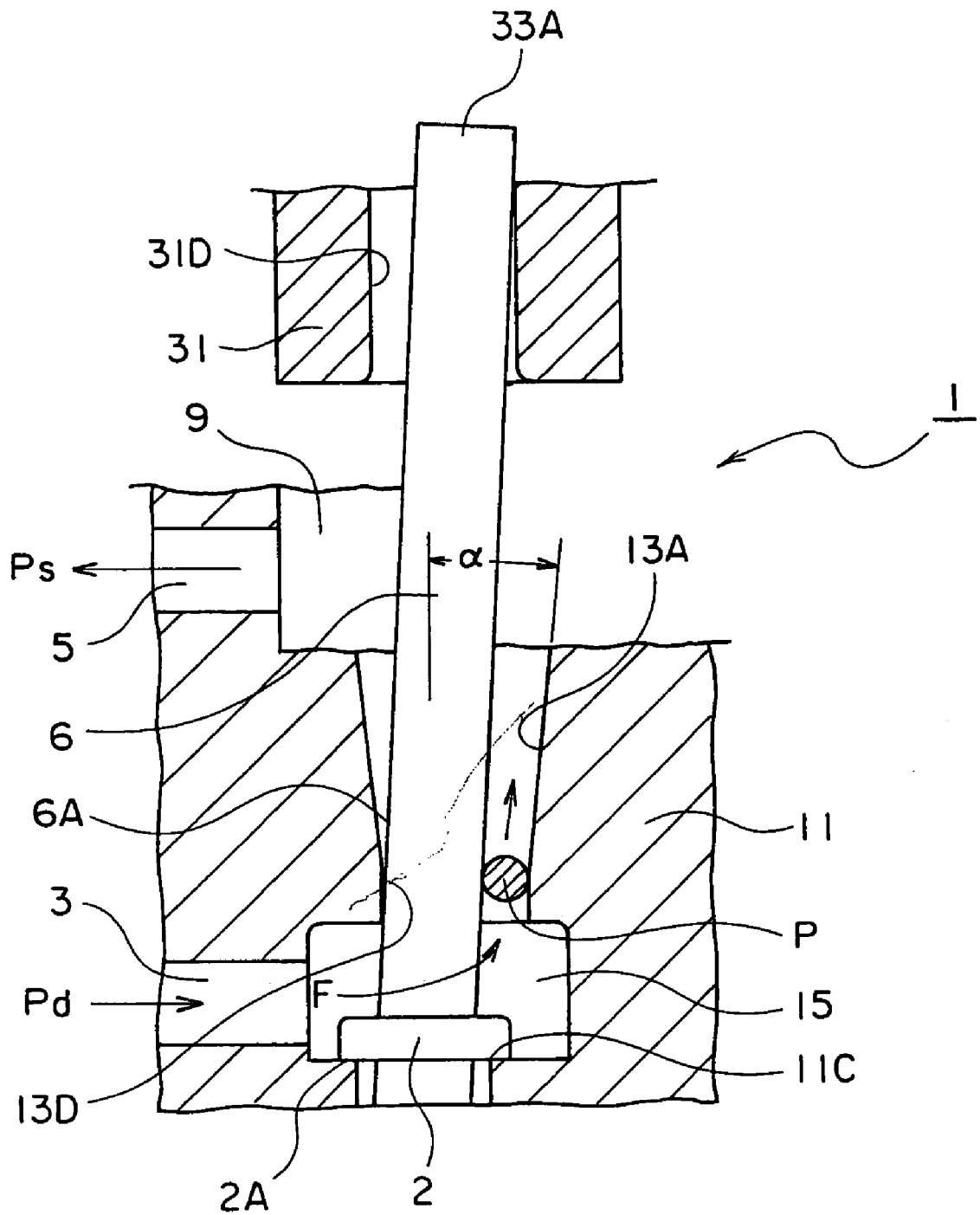
FIG. 3 is a full cross-sectional view of a flow control valve as a second embodiment of the present invention.
Figure 4:
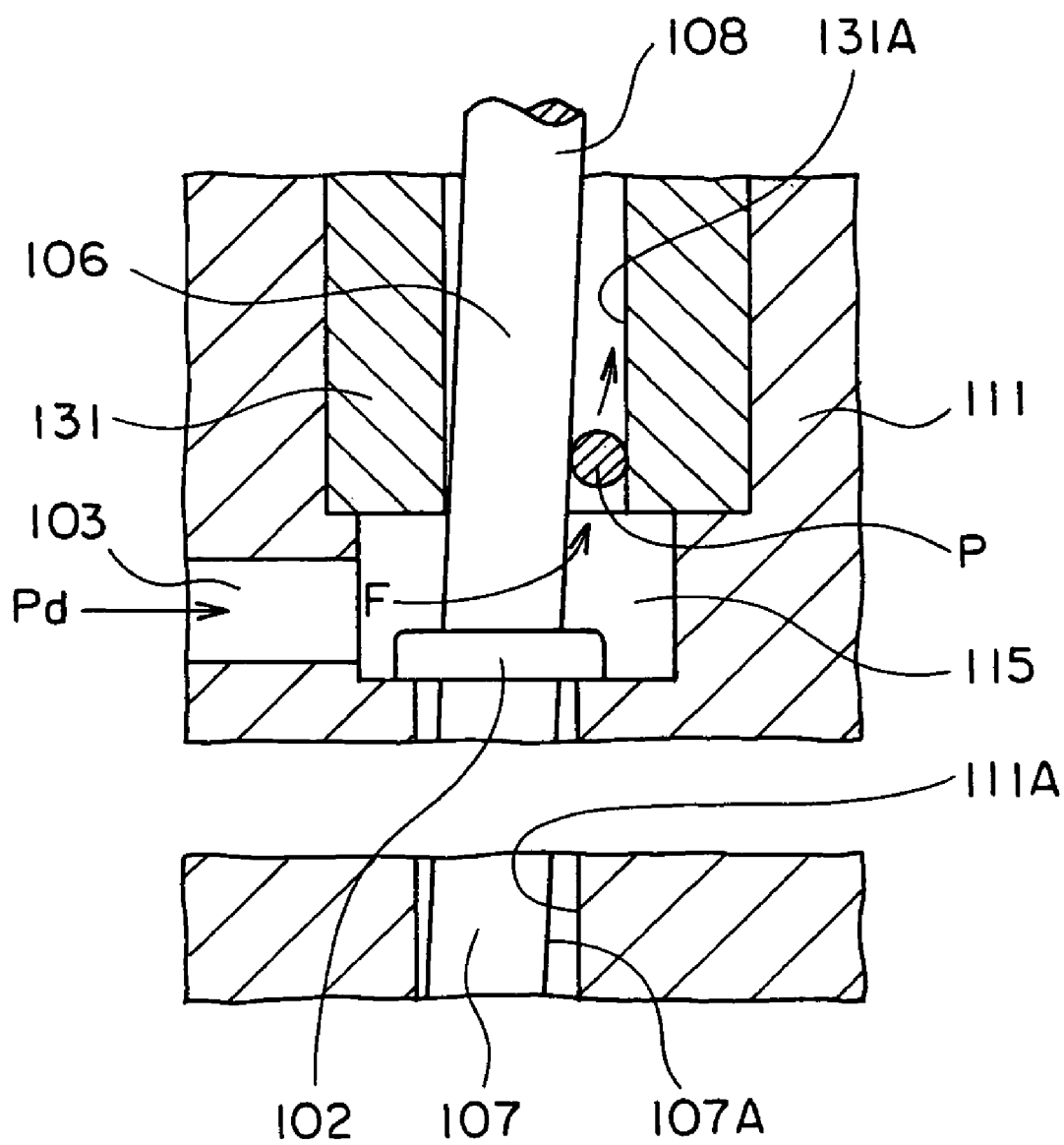
FIG. 4 is a partial cross-sectional view enlarging a portion of the flow control valve in FIG. 5.
Figure 5:
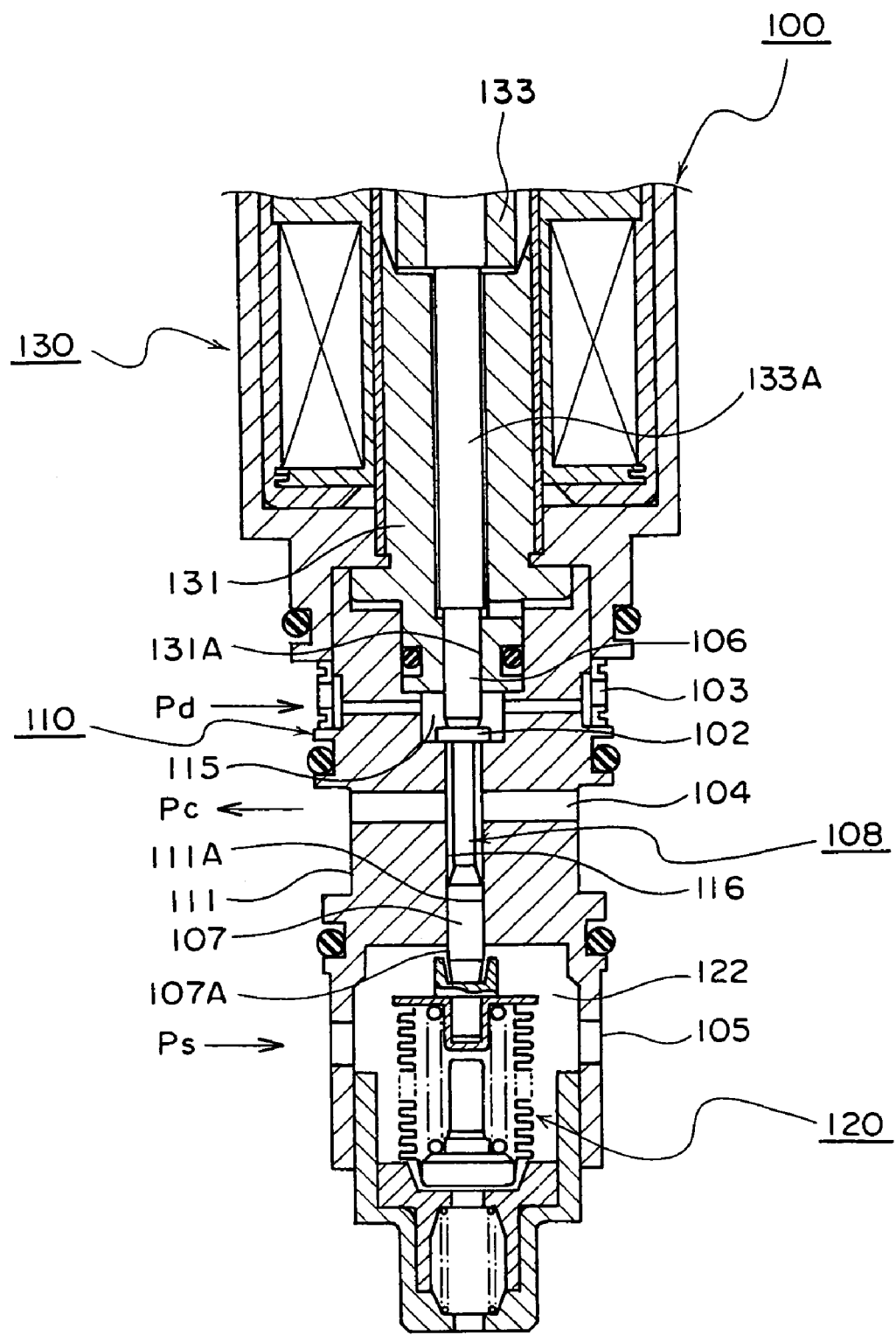
FIG. 5 is a cross-sectional view of a portion of a flow control valve as a prior art relative to the present invention.

FIG. 3 is a cross-sectional view of a portion of the flow control valve 1 as the other embodiment 2 of the present invention. The second embodiment 2 is used for explaining the flow of the fluid under discharge pressure Pd in accordance with valve opening/closing of a valve portion 2 within the first valve chamber 15. The first valve rod 6 and the solenoid rod 33A are connected with each other in which both have more or less the same diameter. And the first valve rod 6 disposes a valve portion 2 thereto which is larger in diameter than the first valve rod 6. Descriptions for the other configurations of the first control valve 1 are omitted because the identical reference numerals indicate the same of the flow control valve 1 in FIG. 1. The fluid at discharge pressure Pd is likely to contain a variety of fine particles as mentioned earlier.

As shown in FIG. 3 by an enlarged figure of the first tapered surface 13A, a fine particle P contained in the fluid at discharge pressure Pd is pushed away toward the first tapered surface 13A by a rapid flow of the pressure fluid passing-through the clearance gap formed between the first fit engagement diameter surface 13D and the first valve rod 6 even after the particle P gets caught between the first fit engagement diameter surface 13D and the first circumferential surface 6A. Then the particle P is easily discharged toward the second valve chamber 9 side owing to the gradually widening clearance gap between the first tapered surface 13A and the first valve rod 6. Therefore the first valve rod 6 can prevent a fine particle P from getting caught in the clearance gap between the first tapered surface 13A and the first valve rod 6 and deteriorating the response in valve opening/closing actions. Then the first valve rod 6 is able to operate as desired without a friction force due to the fine particles P according to the combination of the respective forces of the solenoid portion 30 and of the pressure-sensing device 20 (refer to FIG. 1). The first valve rod 6 is made of stainless steel. Also the valve housing 11 is made of brass. The first circumferential surface 6A of the first valve rod 6 should preferably be given a surface hardening treatment. The valve housing 11 may alternatively be made of a material such as aluminum, iron, plastic or the like. The foresaid values mentioned in the respective embodiments merely represent one possible embodiment and can be modified in accordance with the dimension of the flow control valve 1.

Construction and operational effect of a flow control valve as other embodiments related to the present invention will be described below.

In a flow control valve of the first invention relative to the present invention, a pressure fluid passing through the first passageway is fluid at discharge pressure, and the through bore communicates a second valve chamber which receives fluid at suction pressure at the opposite side of the first valve chamber and the valve hole communicates a second passageway which receives fluid at control pressure.

According to the flow, control valve of the first invention, in a compressor and the like a control pressure is lower than a discharge pressure which is for pressure fluid and a suction pressure is even lower than the control pressure. Therefore as the discharge pressure is the highest of all, the pressure fluid is likely to flow from the first valve chamber into the clearance gap between the first valve rod and the through bore. However, since the through bore retains a tapered surface therein, fine particles contained in the pressure fluid are effectively prevented from being trapped in the clearance gap between the first valve rod and the through bore. Therefore it is of great advantage that the response of the flow control valve during its operation is enhanced.

In a flow control valve of the second invention relative to the present invention, there is disposed a first fit engagement diameter surface more or less in parallel with the axial center between the first valve chamber and the first tapered surface wherein the length of the first fit engagement diameter surface is in the range of from 1 mm to 3 mm.

According to the flow control valve of the second invention, as the length of the first fit engagement diameter surface abutting the first valve chamber is arranged in the range of from 1 mm to 3 mm, the first fit engagement diameter surface provides a better guide for the first valve rod with respect to the axial center, thereby exhibiting an ejection effect of the fine particles. As the clearance gap between the first valve rod and the first fit engagement diameter surface can be arranged small, it is also of great advantage that a seal performance at the clearance gap between the first valve rod and the first fit engagement diameter surface is improved. Furthermore, the first fit engagement diameter surface can prevent the first valve rod from tilting, thereby preventing wear thereof.

In a flow control valve of the third invention relative to the present invention, a first tapered surface is disposed in an abutting relation to the first valve chamber.

According to the flow control valve of the third invention, since there is disposed a first tapered surface in the through bore in an abutting relation to the first valve chamber, fine particles are ejected without getting caught on the first tapered surface. Also as only a small area thereof is subjected to sliding with the first valve rod, it is advantageous that wear of the first valve rod can be prevented. More particularly, the foresaid advantage becomes even more significant if the first tapered surface is chamfered to a circular arc form in the first valve chamber side. And besides, applying a hard material for the first tapered surface of the valve housing is of great advantage to prevent wear of the first tapered surface.

In a flow control valve of the fourth invention relative to the present invention, the inclination angle of the first tapered surface with respect to the axial center is in the range of from 0.11 degrees to 0.5 degrees.

According to the flow control valve of the fourth invention, since the inclination angle of the first tapered surface with respect to the axial center is in the range of from 0.11 degrees to 0.5 degrees, the first valve rod can securely be retained even if the axial length of the first tapered surface is made short.

Also the inclination angle of the first tapered surface can effectively prevent fine particles from getting caught between the first valve rod and the first tapered surface and besides, the valve body disposed in the first valve rod is maintained to a normal state such that the valve body is rested onto the valve seat as specified in its closing action.

INDUSTRIAL APPLICABILITY

As described so far a flow control valve of the present invention is advantageous in the applications to the pressure control of a control chamber in pneumatic machinery, compressor and the like. It is particularly advantageous as a flow control valve not only for exhibiting an outstanding response during operations of a valve rod even under the presence of fine particles contained in the pressure fluid but also for preventing wear of sliding surfaces in the vale rod.

The invention claimed is:

1. A flow control valve for controlling a flow volume of pressure fluid by means of a valve rod making a valve portion rest on or lift from a valve seat, said flow control valve comprising:
    a) a first valve rod having said valve portion and a first circumferential surface defined on outer circumference thereof; and
    b) a valve housing having a first valve chamber and a through bore defined therein, said first valve chamber including a valve seat and a first passageway communicatively connected to said first valve chamber, said valve seat being located on the a perimeter of said first valve chamber, said first passageway permitting pressure fluid to flow thereto, said first valve chamber opening or closing relative to said valve portion, said through bore communicating with said first valve chamber at an opposite side of said valve seat, said through bore forming a fit engagement in a freely moveable manner with said first circumferential surface of said first valve rod,
    wherein said through bore of said valve housing includes a first tapered surface which opens in a diverging manner as moving away from said first valve chamber,
    wherein a first fit engagement diameter surface of said through bore extends in a substantially parallel manner relative to a longitudinal axis extending between said first valve chamber and said first tapered surface, and
    wherein pressure fluid flowing through said first passageway is flowing at discharge pressure,
    wherein said through bore communicates with a second valve chamber disposed opposite said first valve chamber and which permits fluid to flow thereto at suction pressure,
    wherein said first fit engagement diameter surface is configured to open in a diverging manner which extends away from said first valve chamber, and said first tapered surface is configured to have an inner diameter which gradually increases in a direction extending toward towards said second valve chamber, and
    wherein said first fit engagement diameter surface forms a moveable fit engagement relative to said first circumferential surface of said valve rod in a slidably supportive manner along the longitudinal axis with a clearance gap defined therebetween which aligns the first valve rod with the longitudinal axis during execution of specified operations of the first valve rod to allow said valve portion to open or close said first valve chamber.

2. The flow control valve according to claim 1, wherein a valve hole of said valve sheet communicates with a second passageway defined in said valve housing, said second passageway permitting fluid at a control pressure to flow thereto.

3. The flow control valve according to claim 1, wherein a length of said first fit engagement diameter surface extending along the longitudinal axis ranges from 1 mm to 3 mm.

4. The flow control valve according to claim 3, wherein an inclination angle of said first tapered surface with respect to the longitudinal axis ranges from 0.11 degrees to 0.5 degrees.

5. The flow control valve according to claim 1, wherein an inclination angle of said first tapered surface with respect to the longitudinal axis ranges from 0.11 degrees to 0.5 degrees.

6. The flow control valve according to claim 1, wherein the clearance gap between the first circumferential surface of said first valve rod and said first fit engagement diameter surface ranges from 0.01 mm to 0.08 mm.

7. The flow control valve according to claim 1, wherein an outer diameter of said first valve rod is substantially equal to an inner diameter of said first circumferential surface extending along the longitudinal axis from said first valve chamber through said first fit engagement diameter surface, and said first tapered surface towards said second valve chamber.

* * * * *